United States Patent [19]
Denman, Jr.

[11] Patent Number: 6,077,004
[45] Date of Patent: Jun. 20, 2000

[54] HITCH ANCHORING ASSEMBLY

[75] Inventor: Stuart G. Denman, Jr., Charleston, Miss.

[73] Assignee: Stuart G. Denman, Jr. DVM, Charleston, Miss.

[21] Appl. No.: 09/136,477

[22] Filed: Aug. 19, 1998

[51] Int. Cl.⁷ ....................................... B60P 7/08
[52] U.S. Cl. .................... 410/8; 410/3; 410/7; 410/81
[58] Field of Search ................... 410/2, 3, 4, 7, 410/8, 9, 19, 22, 77, 80, 81; 248/500, 503; 224/403, 42.38, 552

[56] References Cited

U.S. PATENT DOCUMENTS

| 3,730,552 | 5/1973 | Clark ............................................ 410/3 |
| 4,277,008 | 7/1981 | McCleary . |
| 4,592,564 | 6/1986 | Warnock et al. . |
| 5,106,002 | 4/1992 | Smith et al. . |
| 5,381,674 | 1/1995 | Omori et al. . |
| 5,423,566 | 6/1995 | Warrington et al. . |
| 5,427,289 | 6/1995 | Ostor . |
| 5,513,868 | 5/1996 | Barr . |
| 5,547,116 | 8/1996 | Eckhart . |
| 5,595,333 | 1/1997 | Boston . |
| 5,699,985 | 12/1997 | Vogel . |
| 5,707,072 | 1/1998 | Hopper . |
| 5,746,275 | 5/1998 | Cross et al. . |
| 5,749,685 | 5/1998 | Hain ............................................ 410/7 |
| 5,816,757 | 10/1998 | Huston ....................................... 410/3 |
| 5,833,412 | 11/1998 | Valencia et al. ............................ 410/2 |

FOREIGN PATENT DOCUMENTS 1186249A   4/1985   Canada ................................. 224/552

Primary Examiner—Stephen T. Gordon
Attorney, Agent, or Firm—Emrich & Dithmar

[57] ABSTRACT

A hitch anchoring assembly for use in securing and anchoring a vehicle to a flatbed is described. The anchoring assembly includes a mounting assembly portion secured to the flatbed of the vehicle. The mounting assembly is adapted to fixedly mount a vertical support member. A vertically adjustable jaw portion is provided which is engageable with the vertical support member. The jaw portion includes upper and lower jaw plate members which define a gap between the members and each plate member includes complementary elongated aligned openings. A pin member is inserted through the elongated aligned openings to fixedly secure the vehicle's hitch plate to the anchoring assembly.

10 Claims, 5 Drawing Sheets

HITCH ANCHORING ASSEMBLY

BACKGROUND OF THE INVENTION

The present invention relates to a hitch anchoring assembly which is mounted to the flatbed of a vehicle or trailer for engaging the hitch of a vehicle for securing the vehicle to the flatbed of the vehicle or trailer.

It is common practice for all terrain vehicles, known as ATVs, to be used in sports and recreation. Accordingly, it is often necessary to transport the ATV to the site in which it is to be used or driven. The transport of the ATV or vehicle is generally accomplished by loading the ATV onto the flatbed of a pickup or onto the flatbed of a trailer for transport. However, it has been found that ATV vehicles and other vehicles, for example, lawn mowers, small tractors, snowmobiles and other types of vehicles, are transported on flatbed of trucks or trailers and possess several types of hitch plate designs. Such hitch plate designs may include a trailer ball or include structures which are positioned at various heights from the flatbed surface. Accordingly, such positions prevent proper securing of the ATV or vehicle via the hitch plate to the flatbed of the vehicle. Consequently, it has been suggested that various strap-type assemblies be used to engage the axis or hitch plate of the ATV or vehicle to secure and anchor the ATV or vehicle to the flat-bed. However, such assemblies require rubber tie-down straps, chains and/or wire to be used to secure the ATV or vehicle to the flatbed. Moreover, on many occasions, such securing assemblies fail during transport of the ATV or vehicle thereby resulting in damage to the ATV or vehicle and, on rare occasions, to injury to the person transporting the ATV or vehicle.

SUMMARY OF THE INVENTION

One object of the present invention is to provide a hitch anchoring assembly which is adjustable in both a horizontal direction and in a vertical direction to provide alignment of the hitch anchoring assembly for engagement with the hitch plate of an ATV or vehicle.

Another object of the present invention is to provide a hitch anchoring assembly which is adjustable vertically with respect to the flatbed of a transport vehicle for alignment and engagement with the hitch plate of the ATV or vehicle.

It is still another object of the present invention to provide a hitch extension plate which may be secured to the hitch plate of the ATV or vehicle which permits the hitch plate of the ATV or vehicle to be secured to the jaw portion of the vertical adjustable hitch anchoring assembly.

In accordance with the present invention, the hitch anchoring assembly is securely fastened or bolted to the flatbed of a pickup or trailer. The hitch anchoring assembly is comprised of a mounting assembly portion having a base plate positioned below the surface of the flatbed of the pickup, truck or trailer and an upper bracket support plate which is aligned and positioned on the upper surface of the flatbed of the pickup or trailer, opposite the base plate. The upper bracket support plate of the hitch anchoring assembly includes an elongated tube support which is structurally arranged and adapted to receive an L-shaped vertical support member therein. The L-shaped vertical support member includes aligned openings in the lower horizontal leg portion which permits the L-shaped member to be horizontally and adjustably secured to and within the elongated tube support, as desired. The L-shaped vertical support member is secured to the elongated tube support by fastening and/or locking means which fixedly mounts the L-shaped support member to the upper bracket support plate. The upper vertical leg portion of the L-shaped support member extends vertically above the flatbed of the pickup or trailer and provides an anchoring post for the vertically adjustable jaw portion of the hitch anchoring assembly.

The vertically adjustable jaw portion of the hitch anchoring assembly includes an upper jaw plate member and a lower jaw plate member which define a slotted opening therebetween. In one embodiment of the present invention, the upper and lower jaw plate members are mounted to a L-shaped support member jaw which is adapted to be slidably moveable up and down with respect to the vertical upper leg portion of the vertical support member. The vertical leg portion of the support member includes an anchoring bolt which is adjustable inwardly and outwardly to adjustably secure the L-shaped jaw support member of the hitch assembly with respect to the vertically L-shaped leg portion when the jaw support member is positioned within the upper vertical leg portion. In such a manner, the jaw portion may be properly aligned to receive the hitch plate member extending rearwardly from the ATV or vehicle axis. When the hitch plate member is aligned within the upper and lower jaw portion, a pin or locking member is inserted through the aligned openings of the upper and lower jaw portions to firmly secure the ATV or vehicle to the vehicle flatbed.

The present invention consists also of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating and understanding the present invention, there is illustrated in the accompanying drawings a preferred embodiment thereof from inspection of which, when considered in connection with the following description, the invention, its construction and operation, and many of its advantages will be readily understood and appreciated.

DETAILED DESCRIPTION

Figure 1:
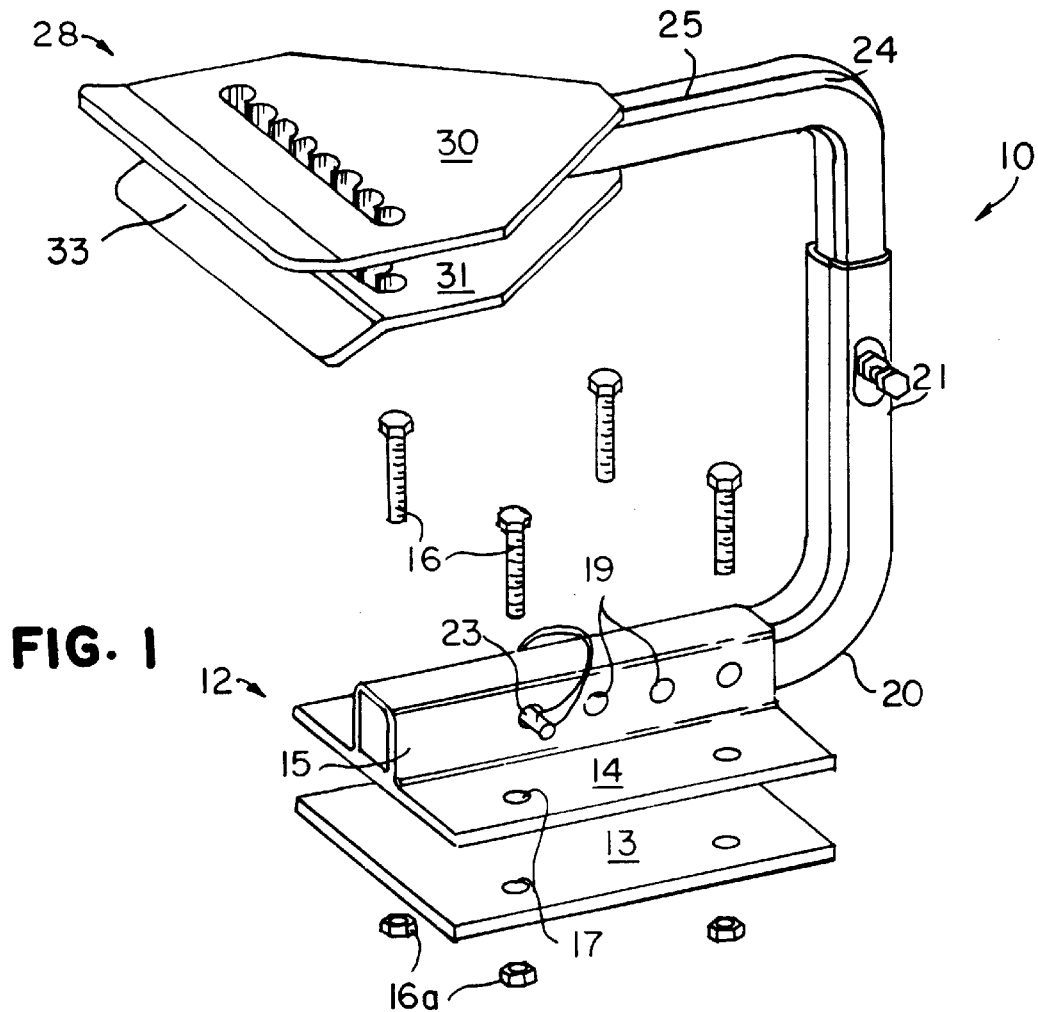
FIG. 1 is a perspective view of the hitch anchoring assembly in accordance with one embodiment of the present invention.
Figure 2:
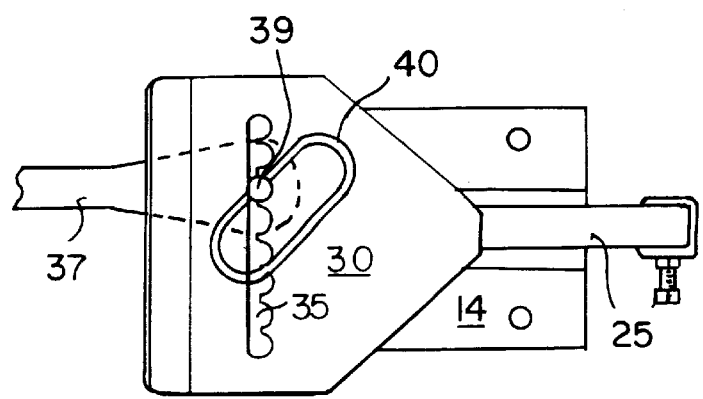
FIG. 2 is a top view of the hitch anchoring assembly in accordance with the embodiment shown in FIG. 1 illustrating the engagement with the hitch plate of vehicle.

Referring now to the drawings wherein like numerals have been used throughout the several views to designate the same or similar parts, in FIG. 1 a hitch anchoring assembly 10 for anchoring an ATV or vehicle to a truck bed or trailer is shown. The hitch anchoring assembly 10 is comprised of a mounting assembly portion 12 which is comprised of a base plate 13 and an upper bracket support plate 14. The base plate 13 is designed to be mounted to the under surface of a truck or trailer bed (not shown) in aligned relationship with the upper bracket support plate 14 that is mounted on the upper surface of the truck or trailer bed. As shown in FIG. 1, a plurality of bolts 16 and nuts 16a are designed to engage openings 17 in the base plate and the upper bracket support plate to fixedly mount the mounting assembly portion to the truck or trailer flatbed.

Figure 3:
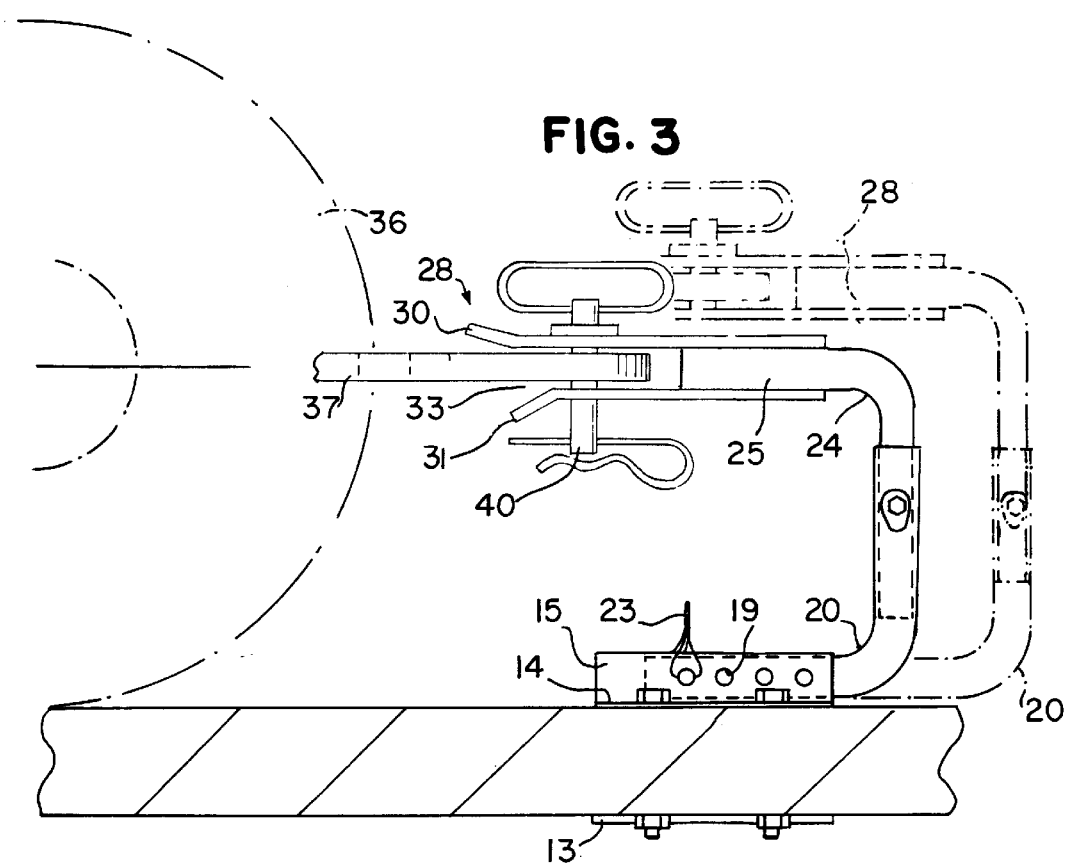
FIG. 3 is a cross-sectional view showing the hitch anchoring assembly, in accordance with FIG. 1 engaging the hitch plate of an ATV or vehicle.
Figure 5:
FIG. 5 is an end view of the upper bracket support plate of the mounting assembly portion of the hitch anchoring assembly in accordance with the present invention.
Figure 7:
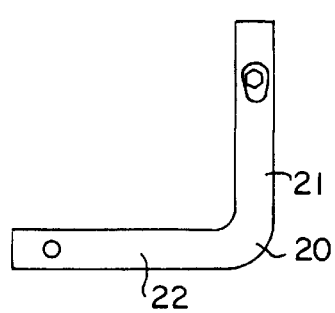
FIG. 7 is a perspective view of the L-shaped vertical support member of the hitch anchoring assembly in accordance with one embodiment of the present invention.

FIG. 5 is an end view of the upper bracket support plate 14 which includes an elongated tube support member 15 which is adapted to receive and mount the L-shaped vertical support member 20 (FIG. 7). As shown in FIG. 7, the L-shaped vertical support member 20 has a horizontal lower leg portion 22 which is adapted to be received within and secured to the tube support member 15 of the upper bracket support plate 14 to anchor the L-shaped support member 20 to the mounting assembly portion 12. As shown in FIGS. 1 and 3, the tube support portion 15 includes a plurality of aligned openings 19 therein which permit the axial adjustment of the L-shaped vertical support member 20 with respect to the upper bracket support plate 14. Pin or locking means 23 may be provided to firmly secure the L-shaped vertical support member 20 to the tube support member 15 of the upper bracket support plate 14, as shown in FIGS. 1 and 3.

Figure 6:
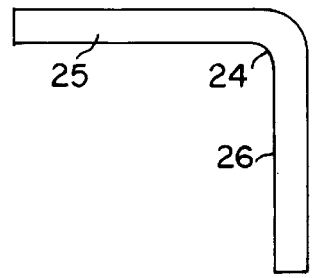
FIG. 6 is a perspective view of the L-shaped jaw support member which is engageable with the L-shaped vertical leg portion of the L-shaped support member in accordance with the present invention.

The tubular L-shaped vertical support member 20 has a vertical leg portion 21 which is adapted to receive and mount an L-shaped jaw support member 24 (FIG. 6), as shown in FIGS. 1 and 3, and which will hereinafter be described. The horizontal leg portion 25 of the L-shaped jaw support member 24 is mounted in a substantially horizontal plane with respect to the upper bracket support plate 14 when in the assembled position and the vertical leg portion 26 is received within the vertical leg portion 21 of the support member 20. However, it is within the scope of the present invention that this male/female relationship between the vertical leg portions may be reversed. Mounted to the horizontal leg portion 25 is a jaw portion 28 of the hitch anchoring assembly 10. The jaw portion 28 is comprised of an upper jaw plate member 30 and a lower jaw plate member 31 that are aligned and mounted to the horizontal leg portion 25 of the L-shaped jaw support member 24. The upper and lower jaw plate members define an opening or gap 33 therebetween. The opening or gap 33 between the upper and lower jaw plates 30 and 31, respectively, is designed to receive the hitch plate 37 which extends rearwardly from the ATV or vehicle 36, as partially shown in FIG. 3. The hitch plate 37 has an opening 39 therein, as is known in the art. As shown in FIG. 3, the vertical adjustable jaw portion 28 may be raised, as shown by the dotted lines 28, and the L-shaped vertical leg portion 20 may be adjusted axially of the support plate 14, as shown by the dotted lines 20 in FIG. 3.

Figure 4:
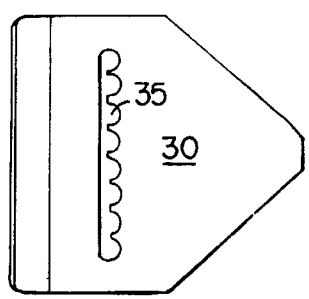
FIG. 4 is a top plan view of the upper jaw plate member of the adjustable jaw portion of the hitch anchoring assembly in accordance with the present invention.

FIG. 4 is a top plan view of the upper jaw plate member 30 showing a serrated opening 35 extending along the width thereof. A complementary serrated opening 35 is positioned in the lower jaw plate member 31. The openings 35 in the upper and lower jaw plates are aligned and permit the reception of a pin locking member 40 therethrough and through opening 39 in the hitch plate 37 which secures the hitch plate to the hitch anchoring assembly, as shown in FIGS. 2, 9, 11 and 13.

Figure 8:
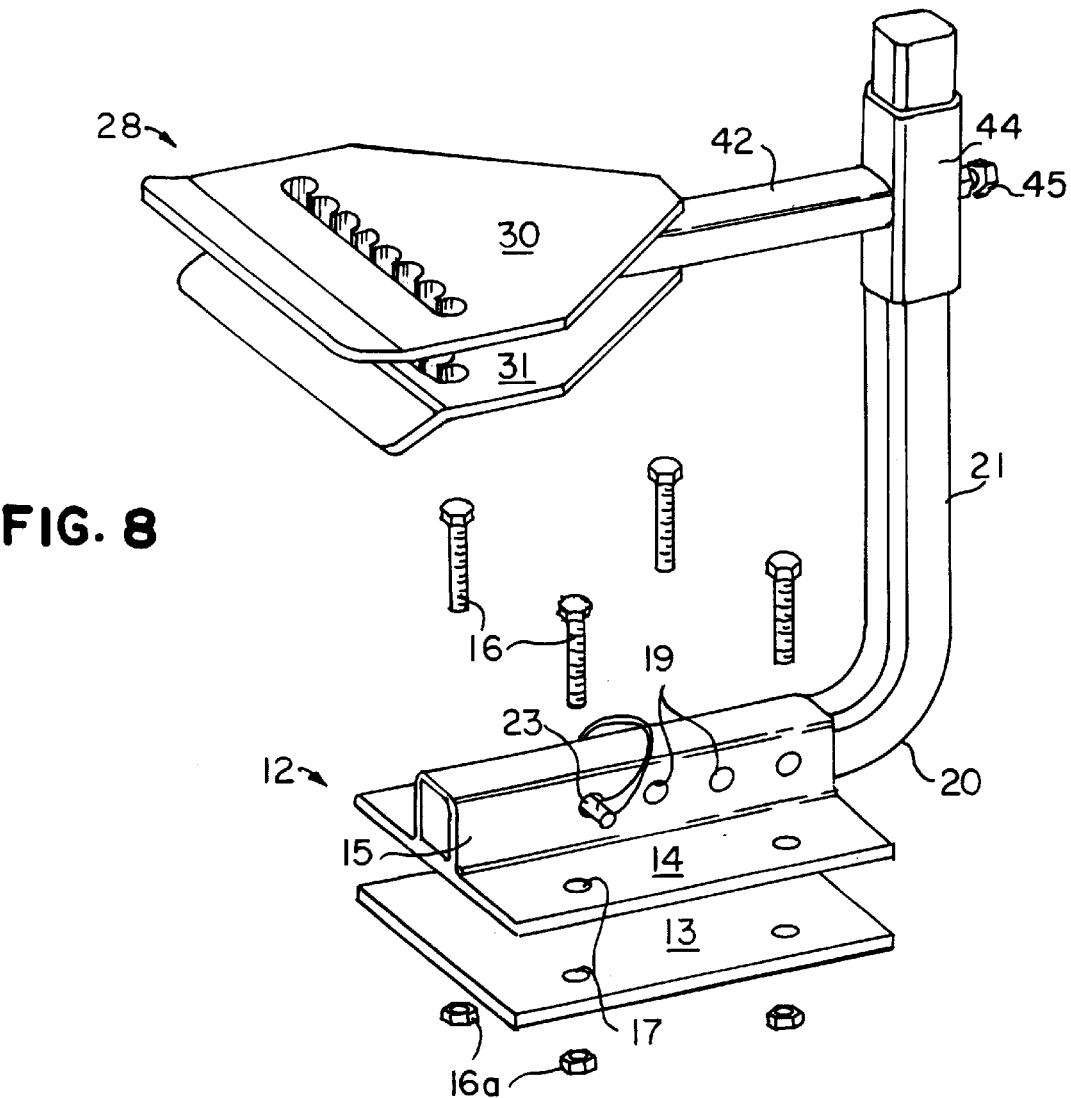
FIG. 8 is a perspective view of a further embodiment of the hitch anchoring assembly in accordance with the present invention.
Figure 9:
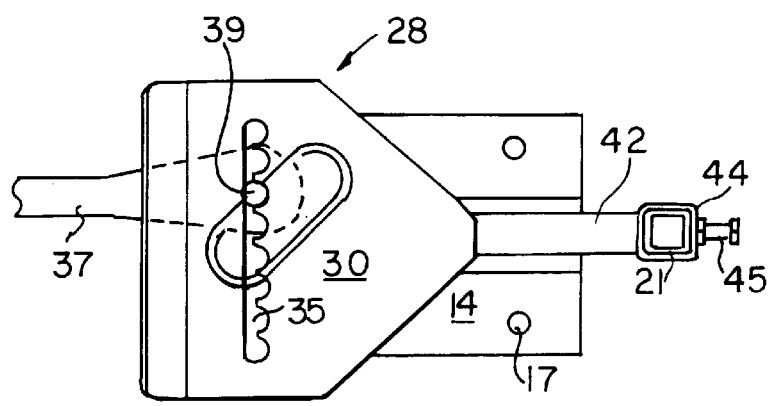
FIG. 9 is a top plan view of the hitch anchoring assembly in accordance with the embodiment of the invention shown in FIG. 8 illustrating the engagement with the hitch plate of the vehicle.

A further embodiment of the hitch anchoring assembly 10 in accordance with the present invention is shown in FIGS. 8 and 9. In such an embodiment, the mounting assembly portion 12 is the same and disclosed in the earlier embodiment of FIG. 1. The mounting assembly portion 12 is comprised of a base plate 13 and an upper bracket support plate 14. Again, as set forth above with respect to the first embodiment, the mounting assembly portion is secured to the surface of the truck or trailer bed. In this embodiment of the present invention, the tubular L-shaped vertical support member 20 has a vertical leg portion 21 which is adapted to receive and mount an L-shaped jaw support member 42 which extends rearwardly from the jaw portion 28 of the hitch anchoring assembly 10 and upon which the jaw portion 28 is mounted. The jaw support member 42 is secured to a sleeve member 44 which is slidably mounted to vertical leg portion 21. The sleeve member 44 includes a height adjustment screw 45 which adjustably fixes the height of the jaw portion to a position which will receive the hitch plate 37 in the gap 33. Again, the jaw portion 28 is comprised of an upper jaw plate member 30 and a lower jaw plate member 31 that are aligned and mounted to the jaw support member 42. The upper and lower jaw plate members 30 and 31 define an opening and gap 33 therebetween which is designed to receive the hitch plate 37 which extends rearwardly of the ATV or vehicle 36, as shown in FIG. 3. The vertical adjustable jaw portion 28 may be raised or lowered as desired and secured to the vertical support member 20 by adjustment screw 45. Accordingly, the jaw portion 28 attached to the member 42 and sleeve member 44 is adapted to slide up and down with respect to the L-shaped vertical leg portion 21. The adjustment screw 45 fixedly mounts the jaw portion at the proper level for receiving the hitch plate 37 of the ATV or vehicle 36, as shown in FIG. 3 and 10.

FIG. 9 is a top plan view of the jaw portion of the hitch anchoring assembly 10 in accordance with the embodiment disclosed in FIG. 8 showing the engagement of the hitch plate 37 within the upper and lower jaw plate members 30 and 31 to secure the ATV or vehicle to the hitch anchoring assembly.

Figure 10:
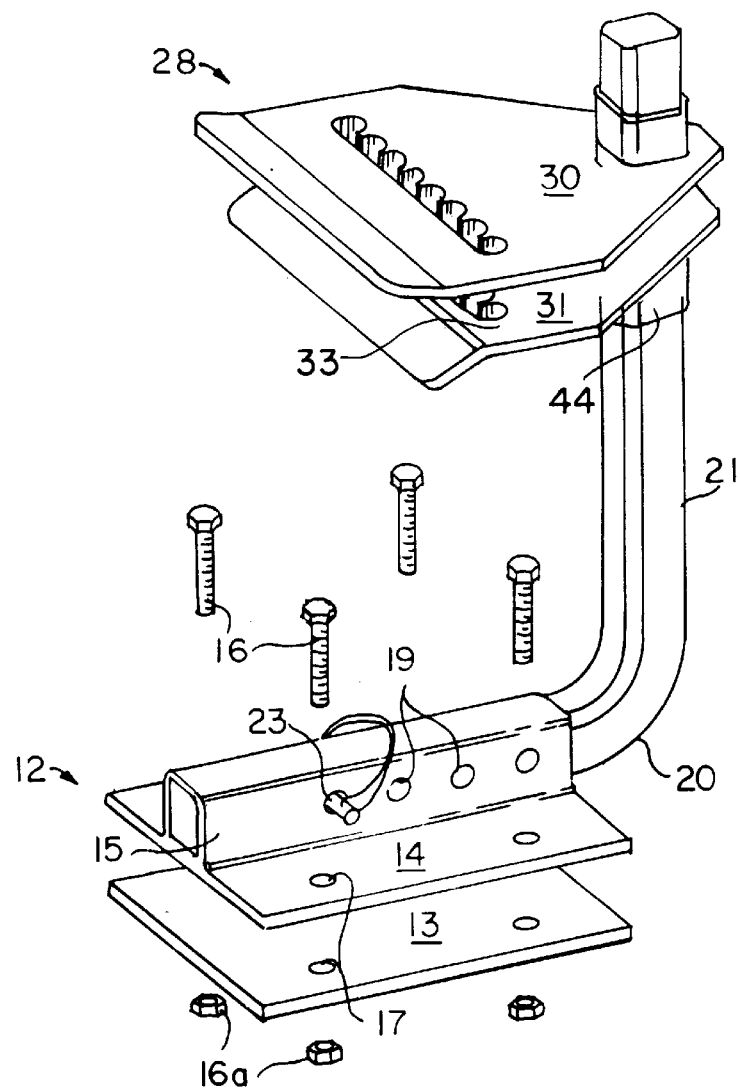
FIG. 10 is a perspective view of a further embodiment of the hitch anchoring assembly in accordance with the present invention.
Figure 11:
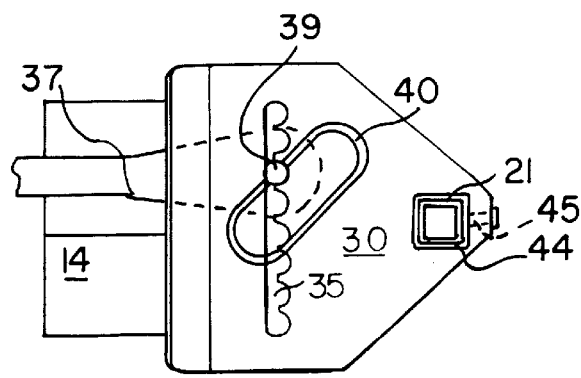
FIG. 11 is a top plan view of the hitch anchoring assembly in accordance with the embodiment of the invention shown in FIG. 10 illustrating the engagement with the hitch plate of a vehicle.

A further embodiment of the present invention is shown in FIGS. 10 and 11. In this an embodiment, the jaw portion 28 comprised of an upper and lower jaw plate members is mounted directly to a sleeve member 44. The sleeve member is adapted to fit around and be slidably moveable with respect to the vertical leg portion 21 of the L-shaped vertical support member 20. This embodiment permits the jaw portion of the hitch anchoring assembly 10 to be mounted adjacent to the vertical leg portion 21 for increased rigidity and strength in anchoring the ATV or vehicle to the flatbed of the pickup or trailer. Again, it is shown that the serrated openings 35 are aligned in the upper and lower jaw plate members and adapted to receive a pin locking member 40 therethrough which engages the hitch plate extension 48, as has heretofore been described.

Figure 12:
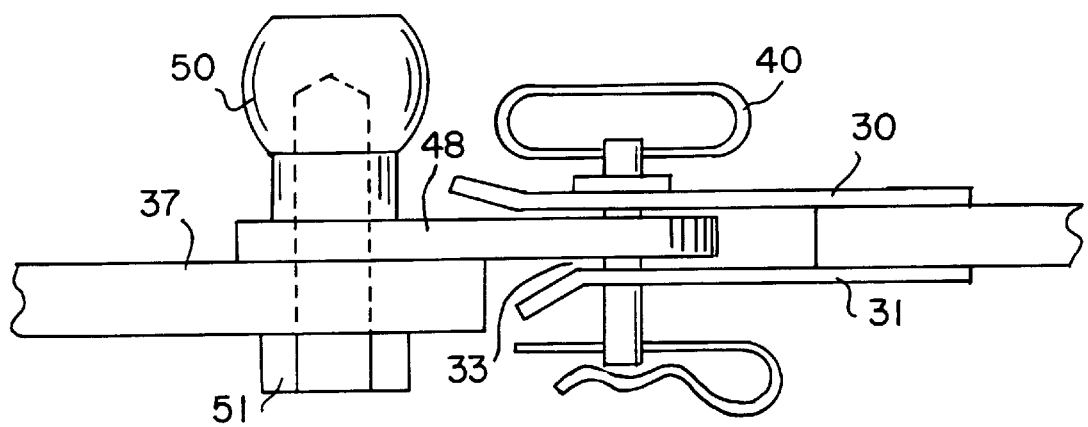
FIG. 12 is an enlarged cross-sectional view showing the mounting of a hitch plate extension member to the hitch plate to permit engagement with the upper and lower jaw plate members in accordance with the present invention.
Figure 13:
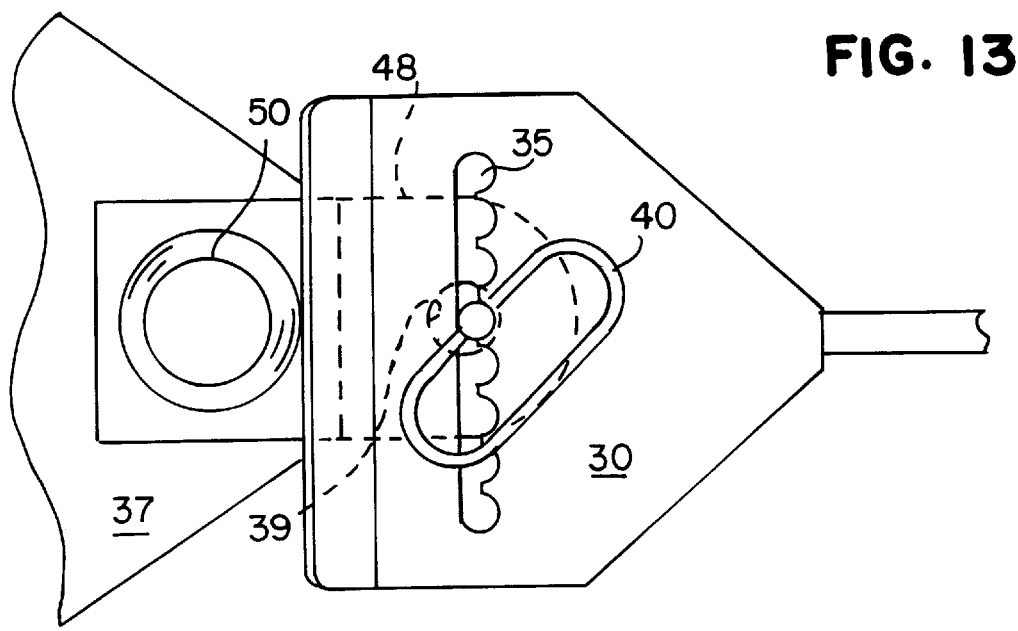
FIG. 13 is a top plan view showing the engagement of the hitch plate extension member to the hitch anchoring assembly in accordance with the embodiment of the invention shown in FIG. 12.

FIGS. 12 and 13 further illustrates a modification of the hitch plate which is useful with the present invention. As shown in FIGS. 12 and 13, a hitch extension plate 48 is mounted to the hitch plate 37 to extend the ATV or vehicle hitch plate rearwardly within the gap 33 to permit the hitch plate to be received and mounted within the upper and lower jaw plate member 30 and 31, as desired. The hitch extension plate 48 is especially useful when the hitch plate 37 of the ATV or vehicle includes a trailer ball 50 which prevents the insertion of the hitch plate 37 into the gap 33 between the upper and lower jaw plate members. Thus, the utilization of a hitch extension plate 48 mounted and secured to the hitch plate 37 by the trailer ball 50 and bolt member 51 extends the hitch plate 37 rearwardly such that the hitch extension plate 48 is properly positioned within the upper and lower jaw plate members for receiving the pin locking member 40 to fixedly secure the ATV or vehicle to the hitch anchoring assembly. FIG. 13 is a top plan view of the hitch extension plate 48 extending rearwardly of the hitch plate and with the opening 39 therein being engaged by the pin locking member 40 to secure the ATV or vehicle to the hitch anchoring assembly 10. Also, as shown in FIGS. 12 and 13, hitch extension member 48 may be used with any hitch plate that has structure that impedes the insertion of the hitch plate into gap 33 between the upper and lower jaw members.

Finally, it is within the scope of the present invention that the ATV or vehicle may be garaged or stored on the flatbed of the pickup truck or trailer during non-transport. In such instance, the pin locking member or means 40 will firmly and securely lock the hitch plate to the anchoring assembly and prevent the possible theft of the ATV or vehicle.

Having thus disclosed in detail a preferred embodiment of the invention, persons skilled in the art will be able to modify certain of the structure which has been illustrated and to substitute equivalent elements for those disclosed while continuing to practice the principle of the invention. It is, therefore, intended that all such modifications and substitutions be covered as they are embraced within the spirit and scope of the appended claims.

I claim:

1. A hitch anchoring assembly for use in conjunction with the flatbed of a transport vehicle for anchoring a vehicle to the flatbed by engaging the hitch plate of the vehicle, including in combination:

a mounting assembly portion secured to the flatbed of the vehicle, said mounting assembly portion including an upper bracket support plate adapted to mount a vertical extending support member;

a vertically adjustable jaw portion engageable with said vertical extending support member, said jaw portion including upper and lower jaw plate members which define a gap therebetween and which include complementary elongated aligned openings in each of said upper and lower jaw plate members; and a pin member inserted through said elongated aligned openings to fixedly secure the vehicle's hitch plate to the anchoring assembly.

2. The hitch anchoring assembly in accordance with claim 1 wherein the mounting assembly portion further includes a base plate portion which is securable to the bottom surface of the flatbed in complementary relationship to the upper bracket support plate member for securing the support member.

3. The hitch assembly in accordance with claim 1 wherein said vertical extending support member is an L-shaped vertical support member with a leg portion secured to said upper bracket support plate and the other leg portion extending vertically.

4. The hitch assembly in accordance with claim 3 wherein said L-shaped vertical support member includes a vertical portion.

5. The hitch anchoring assembly in accordance with claim 1 wherein the elongated aligned openings in each of the upper and lower jaw plate members is serrated and adapted to receive said pin member to prevent lateral movement of the hitch plate in said jaw portion.

6. The hitch anchoring assembly in accordance with claim 1 wherein the hitch plate of the vehicle includes a hitch extension plate attached thereto which extends the hitch plate of the vehicle to permit the pin member to be inserted through the aligned openings in said jaw plate members to secure the hitch plate of the vehicle to the anchoring assembly.

7. The hitch anchoring assembly in accordance with claim 1 wherein said jaw portion is mounted to a sleeve member which is vertically adjustable on said support member.

8. The hitch anchoring assembly in accordance with claim 1 wherein said vertical extending support member is adjustably mounted on said upper bracket support plate.

9. The hitch anchoring assembly in accordance with claim 1 wherein said pin member is a locking member to secure the vehicle hitch plate to the anchoring assembly.

10. The hitch anchoring assembly in accordance with claim 1 wherein said vertically adjustable jaw portion is mounted to a L-shaped jaw support member with a leg portion thereof being secured to said vertical extending support member.

* * * * *